PIVOT STRUCTURE FOR PHONOGRAPH TONE ARMS

Filed June 30, 1948 2 SHEETS—SHEET 1

INVENTOR.
THOMAS E. LYNCH
BY
Elias J. Hyde
ATTORNEY

July 22, 1952 T. E. LYNCH 2,604,326

PIVOT STRUCTURE FOR PHONOGRAPH TONE ARMS

Filed June 30, 1948 2 SHEETS—SHEET 2

*INVENTOR.*
THOMAS E. LYNCH

*BY*

Elmer J. Hyde

ATTORNEY

Patented July 22, 1952

2,604,326

UNITED STATES PATENT OFFICE 2,604,326

PIVOT STRUCTURE FOR PHONOGRAPH TONE ARMS

Thomas E. Lynch, Cleveland, Ohio, assignor to The Brush Development Company, Cleveland, Ohio, a corporation of Ohio Application June 30, 1948, Serial No. 36,043

18 Claims. (Cl. 274—23)

This invention pertains to a pivot structure for the tone arm of a phonograph pickup.

It is essential that the tone arm of a phonograph pickup be able to pivot freely with respect to the panel on which it is mounted to allow the phonograph pickup to move longitudinally across a record being reproduced. It is also essential that the tone arm be able to pivot in a plane substantially perpendicular to the plane of the phonograph record so that it can be lifted up out of the way as a new record is put into place. In the past these requirements have been met by providing two bearings, one permitting one type of motion and the other permitting the other type of motion. An example of such construction is a sleeve which permits the horizontal motion and a hinge which permits the vertical motion.

Some of the prior art devices have performed quite satisfactorily, but their construction is relatively expensive as to material cost, manufacturing cost and assembly cost.

It is an object of the present invention to provide a pivot structure for a tone arm which is inexpensive in its material, manufacturing and assembly costs, and which is simple yet rugged.

Another object of the invention is to provide a pivot structure for a tone arm which provides complete freedom of motion in horizontal and vertical planes.

In accordance with the invention there is provided a pivot structure for a tone arm of a phonograph which comprises an elongated pivot member having a bearing surface at one end. Means are provided securing the pivot member to the phonograph in a substantially vertical direction with the bearing surface uppermost. The tone arm is adapted to hold a transducer at one end and it has an inverted cup-like member at its other end and there is a bearing surface socket in the inside surface of the cup-like member into which the bearing surface of the pivot member fits. Retainer means are secured to the cup-like member and are adapted to slidably engage the pivot member for holding the bearing surface in the socket.

For a better understanding of the present invention, together with other and further objects thereof, reference is had to the following description taken in connection with the accompanying drawings, and its scope will be pointed out in the appended claims.

Figure 1:
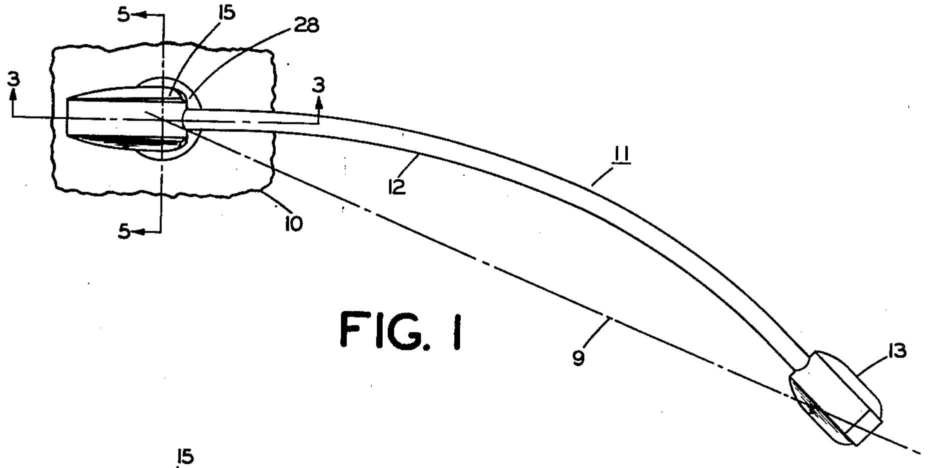
Figure 2:
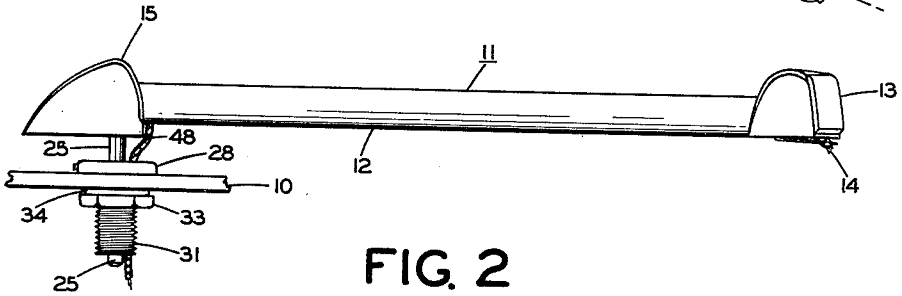
Figure 3:
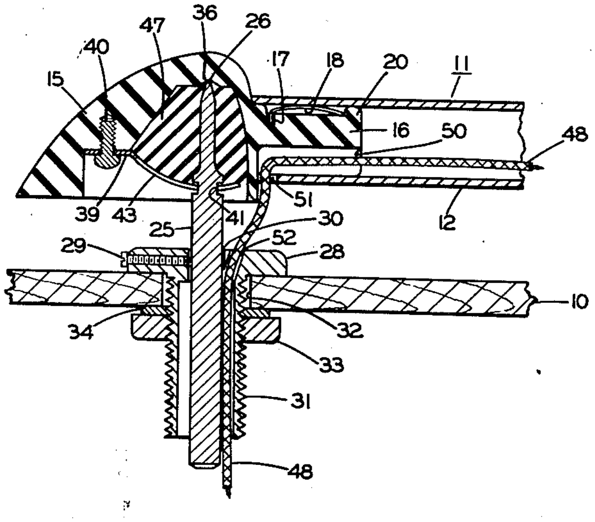
Figure 4:
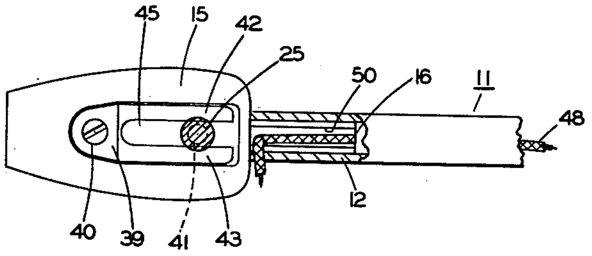
Figure 5:
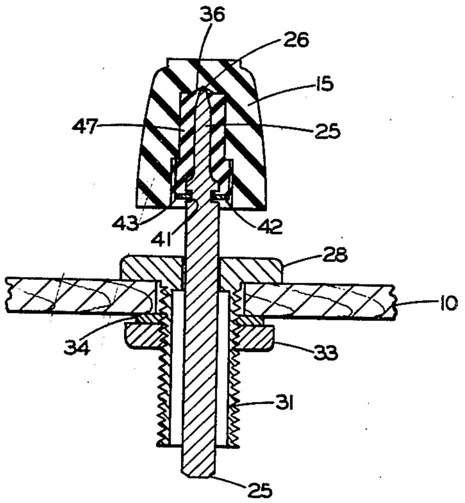
Figure 6:
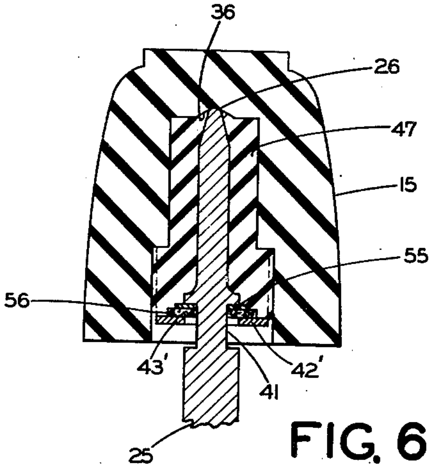

In the two sheets of drawings, Fig. 1 is a top view of a phonograph tone arm; Fig. 2 is a side elevation of the tone arm; Fig. 3 is an enlarged sectional view taken along line 3—3 of Fig. 1 showing the pivot structure; Fig. 4 is an enlarged bottom view of the pivot structure; Fig. 5 is an enlarged sectional view taken along line 5—5 of Fig. 1; and Fig. 6 is an enlarged sectional view somewhat similar to Fig. 5 but of a modified device.

With reference to the drawings, the top panel board of a phonograph is identified by reference character 10, and the tone arm which is secured to the phonograph panel board is identified in general by the reference character 11.

The tone arm 11 is comprised of a long curved tubular member 12 preferably made of a light material such as aluminum. A transducer device 13 is mounted on the forward end of the tubular member 12 and includes a stylus 14 adapted to engage a phonograph record. An inverted cup-like member 15 is mounted on the other end of the tubular member by means of a projection 16 which extends into the end of the hollow tube 12. A hole 17 is provided extending into the projection 16 in a direction substantially perpendicular to the longitudinal axis of the tubular member 12. One end of a wire-like spring device 18 is inserted in the hole 17 and the other end is bent over into engagement with an upwardly extending projection 20. The central portion of the spring device bears tightly against the inner surface of the tubular member 12 thereby tightly holding the tubular member 12 to the cup-like member 15.

An elongated pivot member 25 having a bearing surface 26 at one end is secured to the panel 10 in a substantially vertical direction with the bearing surface 26 uppermost. Any of the well-known adjustable securing means may be utilized to secure the pivot member 25 to the panel 10. Illustrated is a collar 28 having a set screw 29 extending through to the bore 30 and having an externally threaded portion 31. The pivot member 25 extends through the bore 30 and the set screw 29, when tightened down, securely fastens the pivot member to the collar 28. The threaded portion 31 of the collar 28 extends through a hole 32 in the panel 10 and a nut 33 is screwed onto the threaded portion 31 of the collar. A washer 34 preferably is positioned between the nut 33 and the bottom surface of the panel. When the nut 33 and the washer 34 are screwed tightly against the panel 10, the entire assembly including the elongated pivot member 25 is firmly held in place.

A concave socket 36 extends into the top wall portion of the cup-like member 15 to provide a mating bearing surface for the bearing surface 26 at the end of the pivot member 25. The inverted cup-like member 15 fits down over the end of the pivot member 25 with the bearing surface 26 of the pivot member within the concave socket 36 in the inside surface of the cup-like member 15. Such a suspension permits the transducer end of the tone arm 11 to be moved both horizontally and vertically with respect to the panel 10 of the phonograph. Very little frictional resistance to the motions is encountered due to the light weight of the pickup arm and the small area of contact between the two bearing members.

Retainer means are provided for holding the point 26 of the pivot member 25 in the socket 36. The retainer means comprises a two-legged slotted member 39 secured to the cup-like member 15 by means of a screw 40. The pivot member 25 has an annular groove 41 extending around it and one leg 42 of the slotted member 39 is positioned in the groove 41 on one side of the pivot member 25 and the other leg 43 is positioned in the groove on the other side of the pivot member 25. The slot between the two legs 42, 43 extends generally in the direction of extension of the arm 11 so that as the transducer 13 is picked up off of a phonograph record the cup-like member 15 pivots on the pivot member 25 and the slotted member 39 slides with respect to the pivot member 25 until the pivot member is back near the junction of the two legs.

The retainer means 39 preferably is curved, the center of the curvature being the point of contact between the pivot member 25 and the inverted cup-like member 15 and the radius of curvature being equal to the distance from the pivot point to the center of the groove 41 in the pivot member. This prevents the legs 42, 43 from binding in the narrow groove 41 as the transducer is lifted up off of a record.

The construction line 9 shown in Fig. 1 is drawn between the stylus 14 and the pivot point 26. These two points are the only points of arm suspension when the pickup is in operation. Due to the curvature of the arm there is a greater weight to one side of the line 9 than to the other. This unbalance tends to twist the arm 11 about its two supporting points 14 and 26 thereby establishing a side thrust which causes the leg 43 of the retainer means 39 to act as a lateral bearing member to bear gently against the pivot member 25. The arm is accordingly maintained in an upright position. The frictional forces existing between the leg 43 and the pivot member 25 are quite low.

As is seen in Fig. 4 the retainer means 39, with the exception of the slot 45, substantially closes the open side of the cup-like member 15.

In operation there may be a tendency for resonances to cause excessive vibration between the bearing surface 26 and the socket 36. To prevent such excessive vibration the cavity defined by the cup-like member 15 and the retainer means is substantially filled with a viscous semi-solid material 47 such as silicone grease. This material will flow quite readily and allow the pivot member 25 to cut through it when the pickup arm is raised or lowered, but it has a high enough viscosity so it will not flow out of the slot 45.

A convenient way to bring the electrical leads 48 from the transducer 13 into the phonograph is to run them through the hollow tube 12 to the projection 16 from the cup-like member 15. A channel 50 is provided in the bottom of the projection 16 through which the leads 48 extend to a notch 51 in the back edge of the tube 12. The leads extend out through the notch 51 and then down through a hole 52 in the collar 28 to the interior of the phonograph.

Fig. 6 illustrates by a cross-sectional view a slightly modified pivot structure which is particularly adapted for suspending a tone arm whose stylus rests very lightly on a phonograph record. The slot extending between the legs 42', 43' of the modified retainer means 39 is somewhat wider than in the device shown in Figs. 1 to 5. A washer 55 is positioned in the annular groove 41 of the pivot member 25 with its upper face against an outwardly extending shoulder, and a very soft, flexible friction member 56 is positioned beneath the washer 55 and in overlapping relationship with the spaced legs 42', 43' of the retainer means. A suitable material from which to make the friction member 56 is chamois. In the construction shown in Fig. 6 the leg member 43' does not bear against the pivot member 25 as does the leg member 43 of Fig. 5, thereby reducing the magnitude of the frictional forces involved.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A support for a phonograph tone arm comprising, an elongated pivot member having a first bearing surface at one end thereof, means for securing said pivot member to said phonograph in a substantially vertical direction with said bearing surface uppermost, a horizontally extending tone arm adapted to hold a transducer at one end thereof and having a second bearing surface located above the center of gravity of said arm at the other end in engagement with said first bearing surface, and retainer means secured to said tone arm and positioned below and spaced from said first bearing surface holding said two bearing surfaces together, said retainer means comprising a member slotted in the direction of extension of said tone arm and through which said pivot member extends whereby said tone arm may be pivoted in a vertical direction about said two bearing surfaces.

2. A pivot structure as set forth in claim 1, further characterized by said pivot member having an annular groove extending around it, and by said retainer means comprising a bifurcated member having the two legs thereof positioned in said groove on opposite sides of said pivot member.

3. A pivot structure for the tone arm of a phonograph comprising, an elongated pivot member having a bearing surface at one end and having an annular groove extending around it, means for securing said pivot member to said phonograph in a substantially vertical direction with said bearing surface uppermost, said tone arm being adapted to hold a transducer at one end thereof and having an inverted cup-like member at the other end thereof, said cup-like member having a bearing surface socket in its inside surface into which the bearing surface of said pivot member fits, and retainer means secured to said cup-like member and adapted to slidably engage said pivot member for holding said bearing surface in said socket, said retainer means comprising a bifurcated member having the two legs thereof positioned in said groove on opposite sides of said pivot member and said slot extending in the general direction of the extension of said tone arm.

4. A pivot structure as set forth in claim 3, further characterized by said retainer means being curved, the center of curvature being the point of contact between said pivot member and said pivot socket and the radius of curvature being equal to the distance from said point of contact to the center of said groove in said pivot member.

5. A pivot structure as set forth in claim 4, further characterized by said retainer means substantially closing the open side of said cup-like member and by semi-solid damping material within said substantially closed cup-like member and in contact with said cup-like member and said pivot member.

6. A pivot structure as set forth in claim 5, further characterized by said cup-like member comprising a counter-weight, the center of gravity of said counter-weight when supported on said pivot member lying below the said pivot point.

7. A pivot structure for a curved tone arm of a phonograph comprising, an elongated pivot member having a pivot point at one end thereof, means securing said pivot member to said phonograph in a substantially vertical direction with said pivot point uppermost, said tone arm being adapted to hold a transducer including a stylus at one end thereof and having an inverted cup-like member at the other end thereof, said cup-like member having a pivot point socket in its inside upper surface into which the said pivot point fits said socket being above the center of gravity of said tone arm, and lateral bearing means at least a portion of which is secured to said cup-like member and at least a portion of which is adapted to engage said pivot member for preventing the unbalance of said curved tone arm when suspended on said stylus and said pivot member from tilting said tone arm, said bearing means being slotted with said pivot member lying within said slot whereby said arm may be pivoted in a vertical direction around said pivot point.

8. A pivot structure as set forth in claim 7, further characterized by said lateral bearing means including a soft flexible friction pad.

9. A pivot structure as set forth in claim 8, further characterized by said friction pad being made of chamois.

10. In a tone arm and pivot structure for a phonograph, an elongated arm member, a transducer connected to one end of said arm member, a counterweight connected to the other end of said arm shaped as an inverted cup and having a pivot point socket in an underneath surface thereof at a location above the center of gravity of the assembly comprised of said arm member, said transducer and said counterweight, a pivot member having a pivot point at one end thereof, means for securing said pivot member to said phonograph in a substantially vertical direction with said pivot point uppermost and in engagement with said pivot point socket, retainer means in engagement with both said counterweight and said pivot member and secured to one of them for holding said pivot point in said socket, said retainer means being below and spaced from said pivot point, and semi-solid damping material substantially filling the space in said cup above said retaining means and in engagement with said pivot member.

11. A tone arm and support for a phonograph comprising, horizontally extending arm means adapted to hold a transducer at one end thereof and having two portions spaced vertically from each other at the other end thereof, the underneath surface of the upper of said two portions including a bearing surface located above the center of gravity of said horizontally extending arm and the lower of said two portions having a slot through it extending in the direction of said arm, an elongated pivot member having a bearing surface at the upper end thereof and means at the lower end thereof for securing said pivot member to a phonograph in a substantially vertical direction, said pivot member extending through said slot and having its bearing surface in engagement with the bearing surface in the underneath surface of the upper portion of the arm for suspending said arm.

12. A tone arm and support for a phonograph as set forth in claim 11, further characterized by means slidably interconnecting said pivot member and the lower portion of said arm at the location where said pivot member extends through the said slot to prevent said arm from being lifted off of said pivot member.

13. In a pivot structure: a curved phonograph tone arm; an elongated pivot member having first pivot means at one end thereof and means at the other end for securing the pivot member to a phonograph in a substantially vertical direction with said first pivot means uppermost; connection means at one end of said tone arm for holding a transducer, and second pivot means at the underneath surface of the other end of said tone arm for cooperating with the first pivot means for supporting one end of said tone arm on said pivot member, said second pivot means being located above the center of gravity of said tone arm; and bifurcated retainer means connected to said tone arm and positioned on opposite sides of said pivot member for slideably engaging said pivot member to prevent twisting of said tone arm about an imaginary axis extending from said pivot means to said transducer.

14. In an arm and pivot structure; an elongated arm, an inverted cup-shaped member connected to one end of said arm and having a bearing surface located above the center of gravity of said arm and cup-shaped member, a pivot member including means for supporting said pivot member in an upright position and including a bearing surface at the upper end thereof for cooperatively engaging the bearing surface on said cup-shaped member, closure means connected to one of said members and moveable with respect to the other of said members for substantially closing said cup-shaped member, and semi-solid damping material substantially filling the space in said substantially closed cup-shaped member.

15. In an arm and pivot structure; an elongated arm, an inverted cup-shaped member connected to one end of said arm and including a bearing surface located in the bottom of the cup-shaped member above the center of gravity of the unit comprised of said arm and cup-shaped member; an upright pivot member having a bearing surface at its upper end for cooperatively engaging the bearing surface on said cup-shaped member and supporting said unit; closure means connected to said arm and moveable with respect to said pivot member for substantially closing said cup-shaped member; and semi-solid damping material substantially filling the space in said substantially closed cup-shaped member.

16. An arm and pivot structure as set forth in claim 15, further characterized in that said arm is a phonograph pickup tone arm and is curved in a plane substantially parallel to the plane of a record being reproduced, and said closure means engages said pivot member at a location spaced below said bearing surface to prevent the unit comprised of said arm and cup-shaped member from tilting sideways with respect to said pivot member.

17. In a pivot structure for a phonograph tone arm: an elongated pivot member having a pivot point at one end thereof and adapted to have its other end connected to a phonograph with the member in a substantially vertical direction with said pivot point uppermost; an elongated arm member including means at one end for holding a transducer, and having a pivot point socket near the other end located above the center of gravity of said arm member when said transducer is connected to it cooperating with said pivot point for supporting said arm member on said pivot member, said arm member at the location of said pivot point socket having downwardly extending side walls spaced away from said pivot member; a single body of viscous semi-solid material in engagement with said pivot member and in engagement with the said spaced downwardly extending side walls of said arm member for damping vibratory motion between the pivot member and the arm member; and retainer means connected to one of said members for holding said viscous semi-solid material.

18. In a tone arm and pivot structure for a phonograph: an elongated arm adapted when connected to the phonograph to lie in a generally horizontal direction; means at one end of said arm for carrying a transducer and a pivot point socket in an underneath surface of the other end of said arm at a location above the center of gravity of said arm; an elongated pivot member having a pivot point at one end thereof and grooved on either side; means for securing said pivot member to said phonograph in a substantially vertical direction with said pivot point uppermost and in engagement with said pivot point socket; retainer means secured to said tone arm and in engagement with said pivot member for holding said pivot point in said socket, said retainer means comprising a member having edges defining a slot through which said pivot member extends with the portion of said pivot member defining said groove receiving said edges of said retainer means, said slot extending in the direction of the extension of said tone arm whereby said tone arm may be pivoted vertically about said pivot point; and semi-solid damping material in engagement with said pivot member and said tone arm at the location of said pivot point and of such consistency that as the transducer end of said tone arm is raised said pivot member moves through said damping material.

THOMAS E. LYNCH.

REFERENCES CITED

The following references are of record in the file of this patent:

UNITED STATES PATENTS

| Number | Name | Date |
| --- | --- | --- |
| 1,440,180 | Schiff | Dec. 26, 1922 |
| 1,468,224 | Blood | Sept. 18, 1923 |
| 1,780,378 | Dieux | Nov. 4, 1930 |
| 1,830,800 | McClatchie | Nov. 10, 1931 |